(12) United States Patent
Abendschein et al.

(10) Patent No.: US 7,182,523 B2
(45) Date of Patent: *Feb. 27, 2007

(54) CONNECTOR AND RECEPTACLE CONTAINING A PHYSICAL SECURITY FEATURE

(75) Inventors: Frederic H. Abendschein, Columbia, PA (US); Michael Lawrence Gurreri, York, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/025,090

(22) Filed: Dec. 29, 2004

(65) Prior Publication Data

US 2006/0140543 A1 Jun. 29, 2006

(51) Int. Cl.
*G02B 6/38* (2006.01)
(52) U.S. Cl. .................................. 385/56; 439/680
(58) Field of Classification Search ............ 385/56, 385/58, 76, 77, 78, 85; 439/488, 677, 680
See application file for complete search history.

(56) References Cited

U.S. PATENT DOCUMENTS 4,596,436 A * 6/1986 Kraemer et al. ............ 439/701
5,729,644 A * 3/1998 Shiflett et al. ................ 385/59
2002/0126960 A1 9/2002 Gurreri ........................ 385/76

* cited by examiner

*Primary Examiner*—Thanh-Tam Le (57) ABSTRACT

An optical network comprising: (a) a plurality of different optical fiber receptacles for facilitating an optical connection to different information networks requiring different access authorization, each different optical fiber receptacle optically coupled to one and only one different information network, each optical fiber receptacle having an inner surface with a first geometry, the first geometry comprising at least a slot, a certain number of optical fiber receptacles having different first geometries in which the slots are in different positions; and (b) a plurality of different optical fiber plugs for optically coupling with the different optical fiber receptacles, each optical fiber plug having a second geometry, the second geometry comprising at least a key in a certain position, the certain number of optical fiber plugs having different second geometries in which the keys are in different positions, each different first geometry corresponding to one and only one second geometry such that the optical fiber plugs and receptacles of corresponding first and second geometries are mating pairs.

11 Claims, 7 Drawing Sheets

CONNECTOR AND RECEPTACLE CONTAINING A PHYSICAL SECURITY FEATURE

CROSS REFERENCE TO RELATED APPLICATIONS

This application claims priority to U.S. Provisional Application No. 60/218,705, filed Jul. 17, 2000 and to copending U.S. application Ser. No. 09/908,140 filed Jul. 17, 2001 both of which are hereby incorporated by reference.

FIELD OF THE INVENTION

The present invention relates generally to connectors for use in telecommunication networks, and, more specifically, to a connector system in which only certain plugs can mate with certain receptacles to provide discriminating access to particular networks.

BACKGROUND OF THE INVENTION

Fiber optic communication systems have become increasing more popular in recent years as fiber optic technology offers several advantages over the conventional copper wire-based technology. For example, fiber optic communication systems provide substantially increased bandwidth, allowing large volumes of data to be transferred quickly over long distances. Additionally, optical communication systems neither generate nor are susceptible to electromagnetic interference (EMI). Fiber optic systems not only are gaining acceptance as the backbone of many network systems, but are also displacing copper wire technology as the preferred medium for connecting various workstations to the network system. These applications are often referred to as fiber-to-the-desk (FTTD) applications.

The growth of FTTD applications has increased the demands on optical connectors which serve to connect fibers to one another. In particular, connectors are needed that are small enough to be used in an office environment and field installable. A group of connectors were developed to meet this need and are known as Small Form Factor (SFF) connectors. SFF connectors are designed to be the fiber optic equivalent of the small connectors used in copper wire technology, such as, for example, RJ-45 connectors. These small, efficient, easy-to-use SFF connectors have become a new industry standard and are expected to contribute to the continued growth of FTTD applications. SFF connectors of particular interest herein are those based on the MPO ferrule, such as the MPO and Lightray MPX® connectors (see, e.g., U.S. Pat. No. 6,116,790), and those based on the Mini-MPO ferrule such as the MT-RJ connector (see, e.g., U.S. Pat. No. 6,224,268).

Recently, a need has developed to limit user access to particular fiber optic data networks for security or other purposes. While some restrictions may be achieved using software (e.g., passwords), further restriction using some type of physical barrier to the networks is desired. Therefore, there is a need to prevent unauthorized users from connecting to data networks using physical barriers. The present invention fulfills this need among others.

SUMMARY OF THE INVENTION

The present invention provides for a connector system that provides discriminating mating among similar, but different, plugs and receptacles by using a system of geometrically matched connector components which allows certain combinations of plugs and receptacles—i.e., mating pairs—to mate while preventing other combinations from mating. Such a system of mutually-exclusive mating pairs provides for a number of benefits. First, it imparts physical security to a particular network by ensuring that only authorized users who possess a particular connector component can connect to the particular network. Second, the present invention may be employed in the manufacture of devices, requiring fibers or wires to be connected in particular and complex arrangements. In other words, the discriminating connectors of the present invention can be engineered into a system such that, during manufacturing, the correct connection of the fibers/wires is ensured by the mating pairs and their ability to prevent all other "incorrect" connections. Applications requiring particular and complex routing of fibers or wires include, for example, routers, backplane assemblies, and even component devices such as multiplexers/demultiplexers.

Accordingly, one aspect of the invention is a network using the connector system that provides discriminating mating between plugs and receptacles. In a preferred embodiment, the network comprises: (a) a plurality of different optical fiber receptacles for facilitating an optical connection to different information networks requiring different access authorization, each different optical fiber receptacle optically coupled to one and only one different information network, each optical fiber receptacle having an inner surface with a first geometry, the first geometry comprising at least a slot, a certain number of optical fiber receptacles having different first geometries in which the slots are in different positions; and (b) a plurality of different optical fiber plugs for optically coupling with the different optical fiber receptacles, each optical fiber plug having a second geometry, the second geometry comprising at least a key in a certain position, the certain number of optical fiber plugs having different second geometries in which the keys are in different positions, each different first geometry corresponding to one and only one second geometry such that the optical fiber plugs and receptacles of corresponding first and second geometries are mating pairs.

Another aspect of the invention is a optical connector system for providing discriminating mating among a family of optical fiber plugs and optical fiber receptacles. In a preferred embodiment, the system comprises: (a) at least a first optical fiber plug and a second optical fiber plug, the first optical fiber plug comprising a first key in a first position, the second optical fiber plug comprising a second key in a second position, the first and second positions being different, the first and second optical fiber plugs being physically the same except for the position of their respective key; (b) wherein the first optical fiber plug is configured to mate with a first receptacle, the first receptacle having a first slot in a first position, the first slot adapted to receive the first key to allow the first optical fiber plug to mate with the first optical fiber receptacle to form a mating pair, the first key interfering with the second optical fiber receptacle to prevent the first optical fiber plug from mating with the second optical fiber receptacle; and (c) wherein the second optical fiber plug is configured to mate with a second receptacle, the second receptacle having a second slot in a second position, the second slot being adapted to receive the second key to allow the second optical fiber plug to mate with the second optical fiber receptacle to form a mating pair, the second key interfering with the first optical fiber receptacle to prevent the second optical fiber plug from mating with the first optical fiber receptacle.

DETAILED DESCRIPTION OF THE INVENTION

Figure 1:
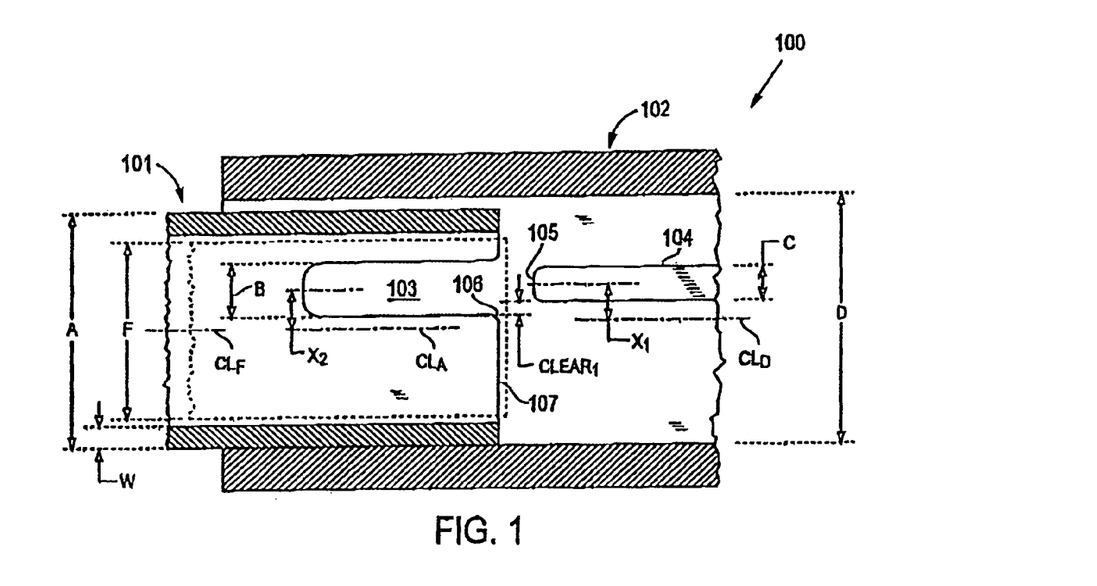
FIG. 1 depicts a top view of a plug as it is insert into the inside portion of the jack for connector intended to mate.
Figure 2:
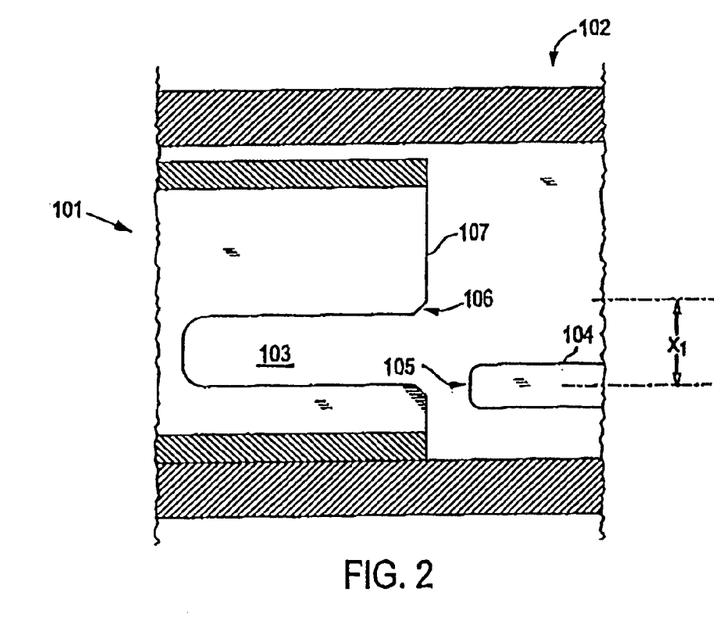
FIG. 2 depicts an expanded top view of a plug having a key, shown prior to an attempt to mate the plug with a connector jack with which it is not intended to mate.
Figure 3:
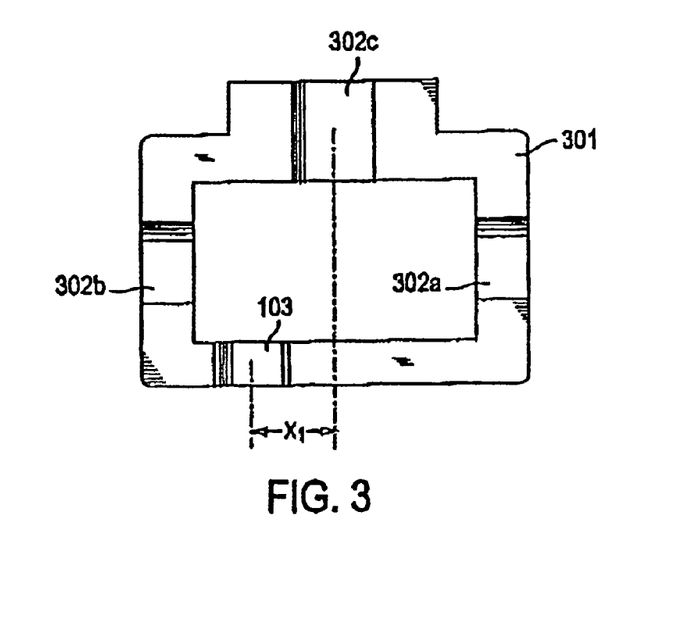
FIG. 3 depicts an end view of a plug, showing a slot which is used to allow or prevent mating with a particular jack.

The present invention relates to a connector system comprising plugs and receptacles which mate in a discretionary way such that components form mating pairs selectively among the various components. Referring to FIGS. 1–4, a preferred embodiment of the connector system of the invention is shown. The connector system comprises a plurality of receptacles and a plurality of plugs (one of each is shown in FIG. 1). Each receptacle has an inner surface with a first geometry. A certain number of receptacles have different first geometries. Each plug has a second geometry, with a certain number of second geometries being different. Each different first geometry corresponds to one, and only one, second geometry such that the plugs and receptacles of corresponding first and second geometries are mating pairs. Therefore, the first and second geometries cooperate to allow only certain pairs of plugs and receptacles to mate (herein "mating pairs," "mating plug and receptacle," or "keyed pair"), while physically interfering for all other combinations of plugs and receptacles (herein "non-limiting pairs," "non-mating plugs and receptacles" or "non-keyed pairs"), thereby preventing non-mating plugs and receptacles from effecting an optical or electrical coupling.

Aside from the variations in the first and second geometries, the plugs and receptacles of the present invention are well known optical or electrical connectors. The plug is received in the receptacle and typically contains a conductive element such a fiber or wire which mates with a similar element or other optical/electrical conduit in the receptacle. In fiber optic applications, it is common for the conductive element to be contained in a ferrule, which in turn is housed by the plug. In a preferred embodiment, the ferrule is an MT-type ferrule, such as the MT and mini-MT ferrule. The receptacle may be any structure having a tub to receive a plug, including, for example, a jack, an adapter for connecting two plugs together, or a connector integrated with an active device (e.g., transceiver) or passive device (e.g., splitter). The connection mechanisms between these plugs and receptacle are well known and will not be discussed in detail herein.

The first and second geometries may embody any known keying mechanism which discriminates between connector components. Such keying mechanisms include, for example, a key and slot relationship between the plug and receptacle, a receptacle dimensioned to receive only certain sized or shaped plugs, and even a magnetic signature for attracting certain components (mating pairs) and repelling other components (non-mating pairs). Preferably, the keying mechanism involves just a slight modification to the plug and receptacle such that essentially the same molds can be used to manufacture connectors of different keyed pairs. Although molding is preferred, it is should be understood that other techniques for producing the first and second geometries can be used including, for example, overmolding and machining.

In a preferred embodiment, the invention uses a key and slot mechanism. The slot can be embodied in the first or second geometry and the key can be embodied in the other geometry. In a first configuration, the slot is embodied in the first geometry and the key is embodied in the second geometry, while in a second configuration, the key is embodied in the first geometry and the slot is embodied in the second geometry.

An embodiment of the invention having the first configuration is shown in FIGS. 1–7. Referring to FIG. 1, a preferred embodiment of a connector system 10 comprising a plurality of mating plugs, one of which, mating plug 101, is shown, and a plurality of receptacles, on of which receptacle 100, is shown. Each receptacle has a tub for receiving a plug. The tub defines an inner surface 12 with a first geometry. The first geometry of the inner surface 12 comprises at least one key 13. A certain number of receptacles have different first geometries in which the key 13 are in different positions. In this particular embodiment, the connector system has four different connector configurations, although the invention is not limited to four. The connector system 10 also comprises a plurality of plugs 81. Each plug has a second geometry which comprises at least a slot 82 in one of four positions, although, as mentioned above, the invention is not limited to four positions.

This configuration is advantageous for a number of reasons. First, since the physical "barrier"—i.e., the key—is located on the receptacle, it will serve to facilitate discriminatory mating among, not only plugs employing security features, but also existing plugs which have no security features of the present invention. Specifically, if a slot in the plug is necessary to accommodate the key of the receptacle, then plugs without slots will not mate with receptacles having the key. Therefore, an ordinary, non-security type plugs which do not have the slot in the proper position will not mate with the receptacle. The same is not true for the second configuration. That is, in the second configuration, the physical barrier—i.e., the key—is disposed on the plug. Thus, an ordinary, non-security type plug which does not have a key may not encounter physical interfere with a security receptacle having a slot. Providing discriminating mating among connecters having security features and those that do not are handled differently in the second configuration as discussed below. Therefore, the first configuration of the connector system tends to discriminate inherently between secure and non-secure connectors.

Another benefit of the first configuration is that the key may cooperate with other "ribs" on an optical connector for pre-alignment purposes. More specifically, with particular reference to FIG. 3, which shows an end view of housing 301 of the plug 101, the housing comprises four walls each wall having a slot 103, 302a, 302b, and 302c, respectively.

Figure 4:
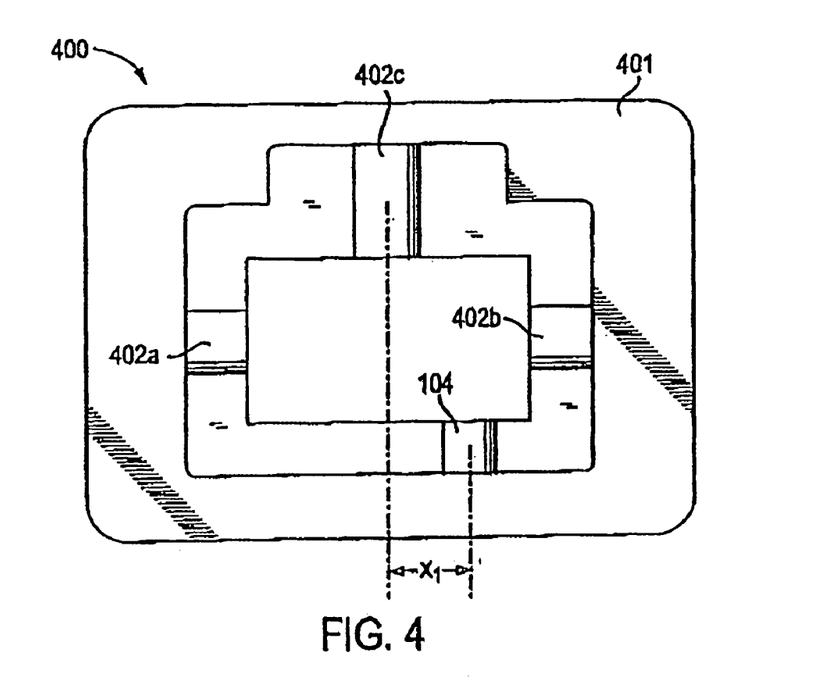
FIG. 4 depicts an end view of a jack, showing the key which is used to allow or prevent mating with a particular plug.
Figure 5:
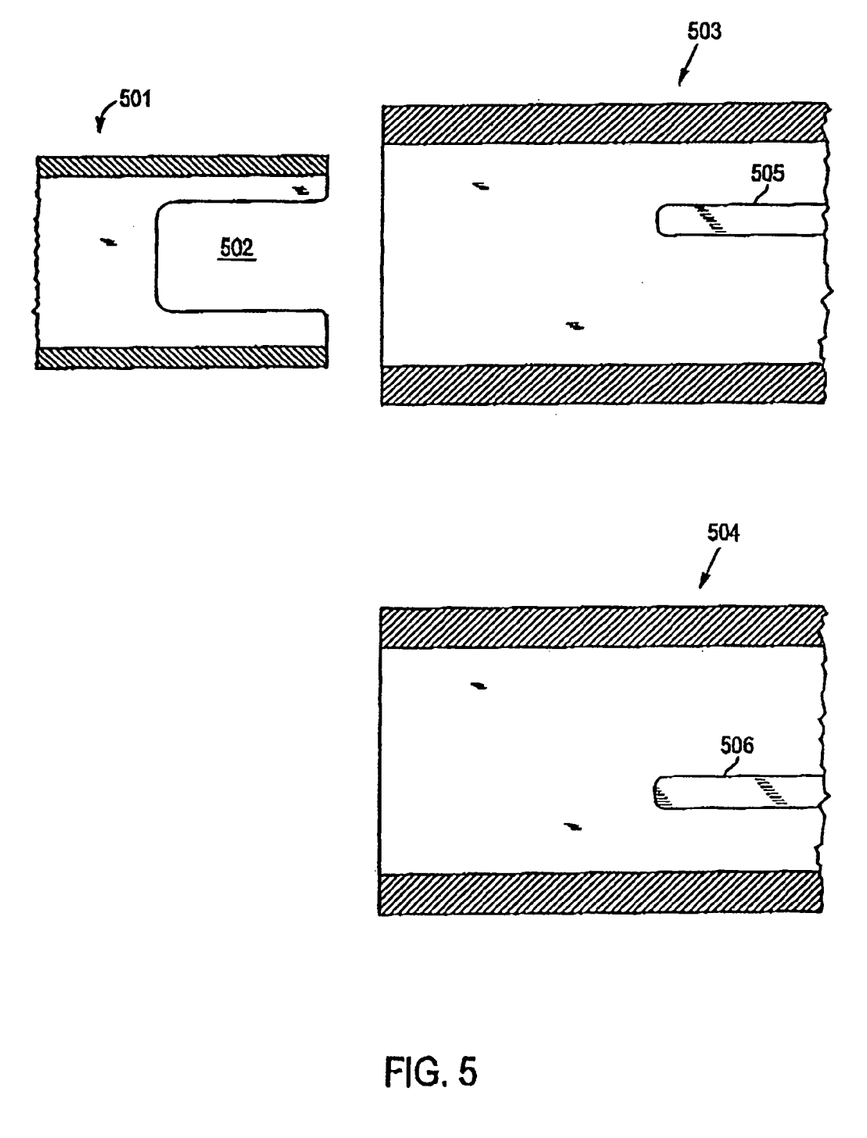
FIG. 5 depicts a plug with a slot configuration capable of mating with a plurality of jacks.

FIG. 4 depicts an end view of housing 401 of the tub 400 in which the key 104 and ribs 402a, 402b, and 402c are disposed on the walls of the housing. The key 104 and the ribs 402a, 402b, and 402c cooperate with the slots 103, 302, 302a, 302b, and 302c, respectively, to effect pre-alignment of ferrule located within the plug with the receptacle before final mating of the connector plug with the connector receptacle. (The final mating may be achieved by precision alignment features located near the conductors, such as, for example, precision alignment pins/receiving holes on face of the MT ferrules. Such ferrules are well known in the art.) By pre-aligning the MT ferrules through the synergistic use of the key and slot, the engagement of the more closely-toleranced final alignment features (e.g., alignment pins/receiving holes) is facilitated.

Figure 6A:
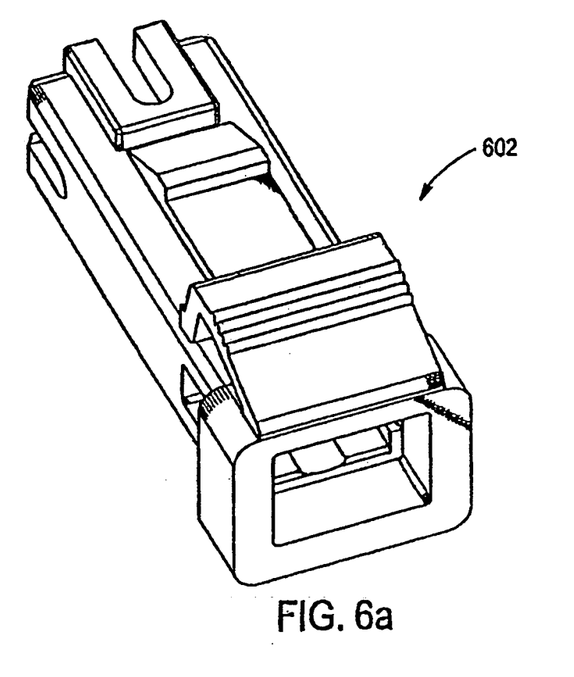
FIGS. 6a–6c and FIGS. 7a–7b show an MT-RJ connector having security features.
Figure 6B:
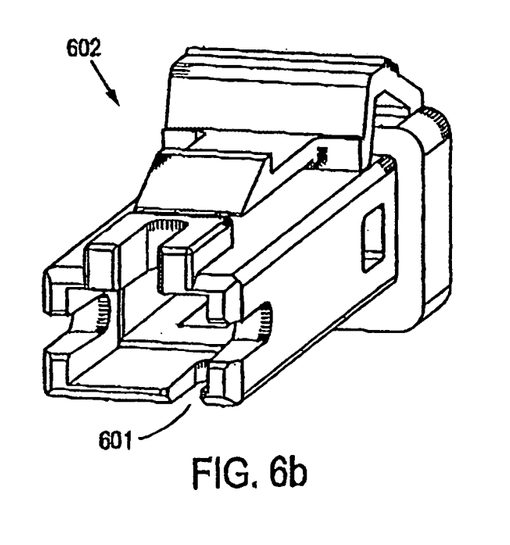
Figure 6C:
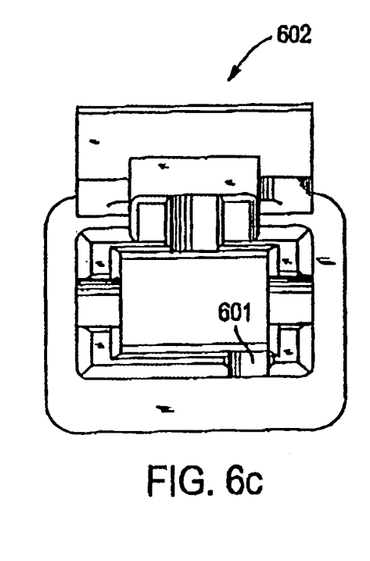
Figure 7A:
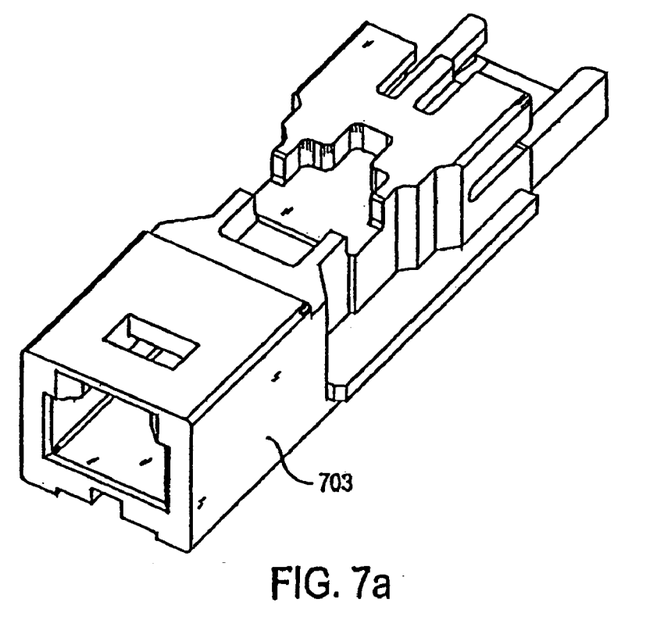
Figure 7B:
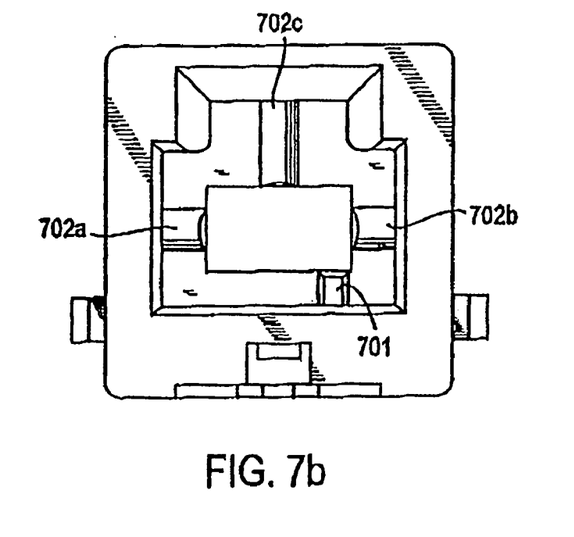

The above-described synergistic keying and aligning feature of the present invention is realized with the MT-RJ connector (Tyco Electronics, Harrisburg, Pa.) as depicted in FIGS. 6(a)–(c). These figures show the plug 602 of the MT-RJ connector combined with the slot 601 of the present invention. FIGS. 7(a) and 7(b) show the center tub portion 703 of an MT-RJ connector jack. The key is shown as 701 located in one of a plurality of possible positions. The three pre-alignment ribs are shown as 702a, 702b, and 702c. The key 701 functions as the discriminating member for allowing or preventing mating with a plurality of plugs, while at the same time functioning as the pre-alignment member for the remaining side of the ferrule not aligned with ribs 702a, 702b, and 702c.

Figure 8:
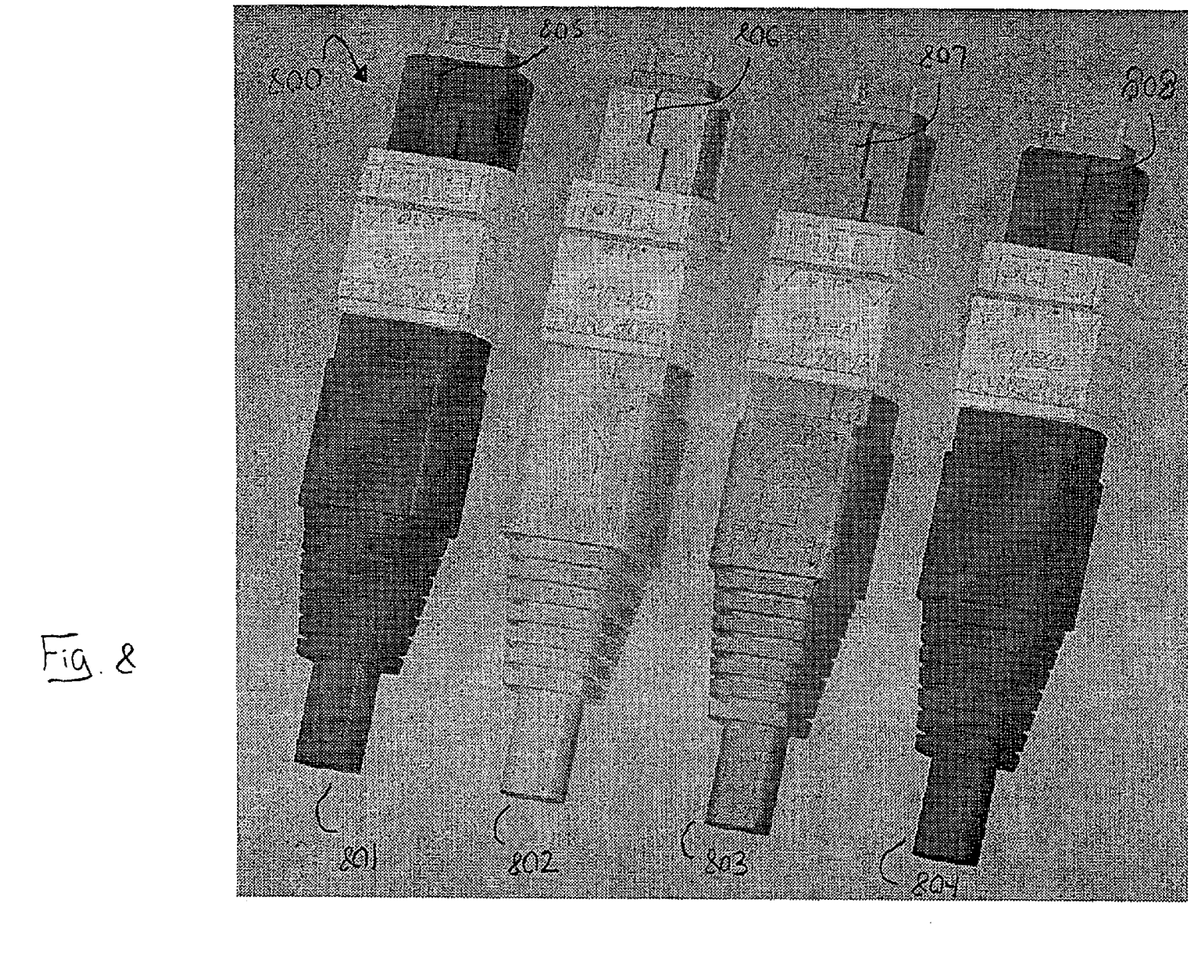
FIG. 8 shows a family of MPO connector plugs having security features.
Figure 9A:
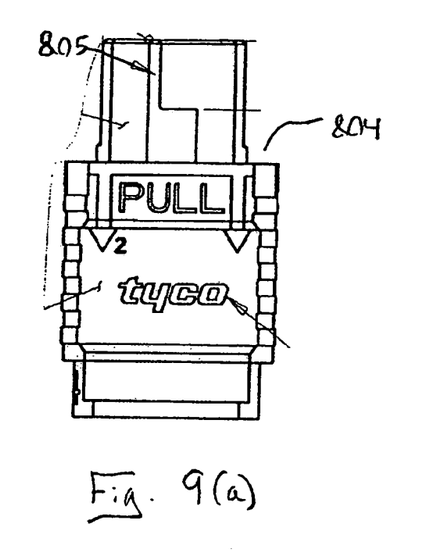
FIGS. 9(a) and 9(b) show top and front views, respectively, of one of the connector plugs of FIG. 8.
Figure 9B:
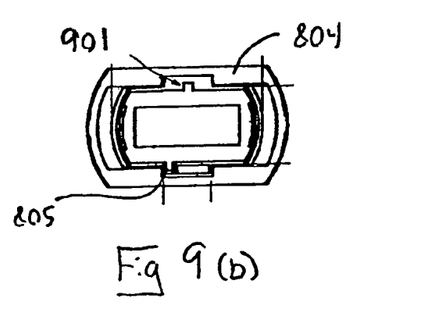
Figure 10A:
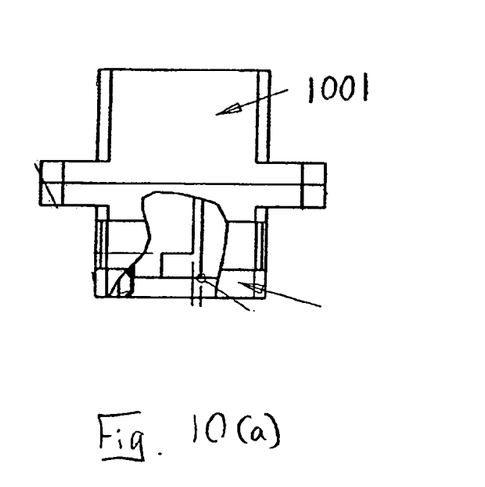
FIGS. 10(a) and 10(b) show a top and front cut-away views, respectively, of a receptacle configured to mate with the connector shown in FIG. 9(a).

Referring to FIGS. 8, 9(a) & (b), and 10(a) & (b), a preferred embodiment of the connector system 800 of the second configuration is shown. The system 800 comprises a plurality of receptacles—an exemplary receptacle 1001 is shown in FIG. 10(a). Each receptacle has an inner surface 1002 with a first geometry. The first geometry of the inner surface 1002 comprises at least one slot 1003. A certain number of receptacles have different first geometries in which the slots 1003 are in different positions. In this particular embodiment, the slots are in four different positions, although the invention is not limited to four. The connector system 800 also comprises a plurality of plugs 801–804 as shown in FIGS. 8 and 9(a) & (b). Each plug has a second geometry which comprises at least a key 805–808 in one of foul positions. T here is a one-to-one correspondence between the plugs 801–804 and their respective receptacles such that each of plug 801–804 mates with one and only one receptacle. Likewise, in a preferred embodiment, each of receptacle mates with one and only one plug.

A connector system having the second configuration offers certain benefits, but also presents certain challenges. One benefit is that the space consuming security feature—i.e., the slot—resides in the receptacle which typically is larger than the plug and better suited for accommodating this feature. Additionally, it may be preferable to have one "master" plug Which plugs into all receptacles having security features. This is easily accomplished with a connector system of the second configuration. Specifically, the master plug would simply be one having no key to interfere with the first geometry of the receptacle. The simplicity in offering a master plug in the connector system of the second configuration also gives rise to a challenge facing the system—the ability of non secure plugs to mate with security receptacles.

To discriminate between secure and non-secure connector systems, one approach is to use a secondary key & slot configuration which is in the same position for non-mating plugs and receptacles of a given connector system, but which is either non-existent or in a different position for all plugs and receptacles which are outside of the given connector system. For example, referring to FIG. 10(b), the first geometry comprises a secondary slot 1004, which is in the same position for all different first geometries of the connector system 800. Referring to FIG. 9(b), the second geometry comprises a secondary key 901, which is in the same position for all different second geometries. Consequently, only plugs and receptacles of a given security system have accommodating keys/slots will mate. In a preferred embodiment, at least a portion of the key is disposed in the receptacle. As mentioned above with respect to the first configuration of the connector system, if the physical barrier-i.e., the key-is located on the receptacle then it interferes with all structures other than those having accommodating slots. Thus, for the same reason the first configuration is preferable for discriminating among different connector systems, having the secondary key on the receptacle may be preferable for discriminating among different connector systems. In sum, the primary keying mechanism provides physical interference among all connectors of a system except for mating pairs, while the secondary keying mechanism provides for physical interference among different connector systems.

It is worthwhile to note that the use of the secondary key/slot adds another security feature to the connector system-essentially another keying mechanism. This additional keying feature increases the number of permutations within a given connector system. That is, rather than maintaining the same secondary key and slot location for all connectors within a system, it can be moved to form different classes within the same family. For example, if there are four positions available for the primary key/slot and four positions available for the secondary key/slot, than instead of having just four mating pairs, the system could be configured to accommodate sixteen.

Figure 10B:
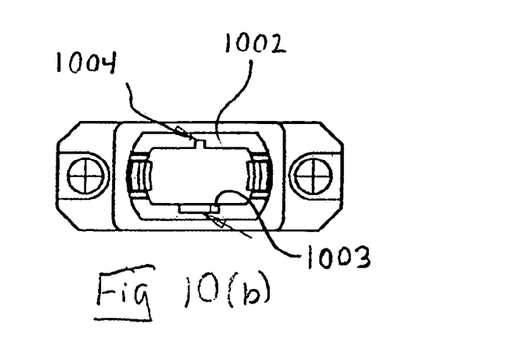

A particularly preferred embodiment of the second configuration of the present invention is shown in FIGS. 8–10. The plugs 801–804, in this particular embodiment, are MPO connector plugs which, like the MT-RJ plug described above, use MT ferrules. The receptacles are adapters. Each adapter is configured to receive a plug at each end to facilitate optical coupling between the plugs. Aside from the keying features described above, this connector system is identical to existing MPO connector systems and the common features between which will not be addressed herein.

Below is a chart illustrating the matability/interference of various plugs and receptacles with reference to the particular keying features.

|  |  | Plug Feature(s) | | | |
| --- | --- | --- | --- | --- | --- |
|  |  | 805 | 805a and 901 | 805b and 901 | 805c and 901 | 805d and 901 |
| Receptacle Feature(s) | 1003 | Mates | Lack of 1004 stops | Lack of 1004 stops | Lack of 1004 stops | Lack of 1004 stops |
|  | 1003a and 1004 | 1003a stops | Mates | 1003a stops | 1003a stops | 1003a stops |
|  | 1003b and 1004 | 1003b stops | 1003b stops | Mates | 1003b stops | 1003b stops |
|  | 1003c and | 1003c stops | 1003c stops | 1003c stops | Mates | 1003c stops |

-continued

| | Plug Feature(s) | | | | |
|---|---|---|---|---|---|
| | 805 | 805a and 901 | 805b and 901 | 805c and 901 | 805d and 901 |
| 1004 1003d and 1004 | 1003d stops | 1003d stops | 1003d stops | 1003d stops | Mates |

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system. For example, referring to FIG. 8, in one embodiment the plugs 801–804 and their respective receptacles are red, yellow, green, blue, respectively.

The system described allows for a series of mutually-exclusive connectors to be used in a manner which provides physical security to a network system. In light of the often highly sensitive data stored on many of the networks in use today, this is a highly desirable feature. The present invention is an effective way to segregate separate networks and assure that the proper users are connecting to the desired network. Additionally, the present invention may be employed in the manufacture of devices in which fibers or wires need to be connected in particular arrangements. More specifically, the discriminating connectors of the present invention can be engineered into a system such that, during manufacturing, the correct connection of the fibers/wires is ensured by the mating pairs and their ability to prevent all other "incorrect" connections. Applications requiring particular routing of fibers or wires include, for example, routers, backplane assemblies, and even component devices such as multiplexers/demultiplexers.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. In a family of connectors comprising a standard optical fiber plug and a standard optical fiber receptacle, a secure connector system for providing discriminating mating among secure and standard optical fiber plugs and optical fiber receptacles, said secure connector system comprising:
at least a first optical fiber plug and a second optical fiber plug, said first optical fiber plug comprising a first key in a first position, said second optical fiber plug comprising a second key in a second position, said first and second positions being different, said first and said optical fiber plugs each comprising a secondary key, said secondary key being in the same relative position on said first and second optical fiber plugs, said first and second optical fiber plugs being physically the same except for the position of their respective key;
wherein said first optical fiber plug is configured to mate with a first receptacle, said first optical fiber receptacle having a first slot in a first position and a secondary key, said first slot adapted to receive said first key and said secondary slot adapted to receive said secondary key to allow said first optical fiber plug to mate with said first optical fiber receptacle to form a mating pair, said first key interfering with a second optical fiber receptacle to prevent said first optical fiber plug from mating with said second optical fiber receptacle;
wherein said second optical fiber plug is configured to mate with said second receptacle, said second receptacle having a second slot in a second position and a secondary key, said secondary slots of said first and second optical fiber receptacles being in the same relative position, said second slot being adapted to receive said second key and said secondary slot being adapted to receive said secondary key to allow said second optical fiber plug to mate with said second optical fiber receptacle to form a mating pair, said second key interfering with said first optical fiber receptacle to prevent said second optical fiber plug from mating with said first optical fiber receptacle;
wherein said standard optical fiber plug does not have a secondary slot, and said standard optical fiber receptacle does not have a secondary key; and
wherein said first and second keys of said first and second optical fiber plugs interfere with said standard optical fiber receptacle to prevent said first and second optical fiber plugs from mating with said standard optical fiber receptacle.

2. The connector system of claim 1, further comprising said first and second optical fiber receptacles, wherein said secondary keys of said first and second optical fiber receptacles interfere with said standard optical fiber plug to prevent said first and second optical receptacles from mating with said standard optical fiber plugs.

3. The connector system of claim 2, further comprising a universal optical fiber plug having no key to interfere with said first and second optical fiber receptacles.

4. The connector system of claim 1, wherein said first and second optical fiber plugs comprise a housing and a ferrule disposed in said housing, said housing of each optical fiber plug defining its respective key and secondary key.

5. The connector system of claim 4, wherein each receptacle is an adapter.

6. The connector system of claim 1, wherein each mating pair is marked with matching visual identification which is unique among the different mating pairs, said visual identification being at least one of color, alphanumerical, or symbol.

7. The connector system of claim 2, further comprising:
third, fourth and fifth optical fiber plugs having a third, fourth and fifth key in a third, fourth, and fifth position, respectively, each position being different, said third, fourth and fifth optical fiber plugs each comprising a secondary key, each secondary key being in the same relative position, said first, second, third, fourth and fifth optical fiber plugs being physically the same except for the position of their respective key;
third, fourth and fifth optical fiber receptacles having a third, fourth and fifth slot in a third, fourth and fifth position, respectively, each position being different, said third, fourth and fifth optical fiber receptacles each having a secondary key in the same relative position, said first, second, third, fourth and fifth optical fiber receptacles being physically the same except for the position of their respective slot;
wherein said third, fourth and fifth slots are adapted to receive said third, fourth and fifth keys, respectively, and said secondary slot of each optical fiber plug is adapted to receive said secondary key of each optical fiber receptacle to allow said third, fourth and fifth optical fiber plugs to mate with only said third, fourth and fifth optical fiber receptacles, respectively;

wherein said secondary keys of said third, fourth and fifth optical fiber receptacles interfere with said standard optical fiber plug to prevent said third, fourth and fifth optical receptacles from mating with said standard optical fiber plugs.

8. The connector system of claim 7, further comprising:

a sixth optical fiber plugs having a sixth key in one of said first, second, third, fourth or fifth positions, said sixth optical fiber plug comprising a secondary slot, said secondary key being in a different position from said secondary slot of said first, second, third, fourth and fifth optical fiber plugs, at least one of said first, second, third, fourth and fifth optical fiber plugs being physically the same as said sixth optical fiber plug except for the position of its secondary slot;

a sixth optical fiber receptacle having a sixth slot in one of said first, second, third, fourth or fifth positions, said sixth optical fiber receptacle comprising a secondary key, said secondary key being in a different position from said secondary key of said first, second, third, fourth and fifth optical fiber recitals, at least one of said first, second, third, fourth and fifth optical fiber receptacles being physically the same as said sixth optical fiber receptacle except for the position of its secondary key;

wherein said sixth slot is adapted to receive said sixth key and said secondary slot of said sixth optical fiber plug is adapted to receive said secondary key of said sixth optical fiber receptacle to allow said sixth optical fiber plug to mate with said sixth optical fiber receptacles; and wherein said secondary key of said sixth optical fiber receptacle interfering with said first, second, third, fourth and fifth optical fiber plugs and said standard optical fiber plugs to prevent mating therewith.

9. The connector system of claim 7, wherein there are at least six mating pairs.

10. The connector system of claim 7, wherein said family of connectors is the MPO connectors.

11. The connector system of claim 2, wherein said secondary key is located inside said receptacle.

* * * * *